Figure 1:
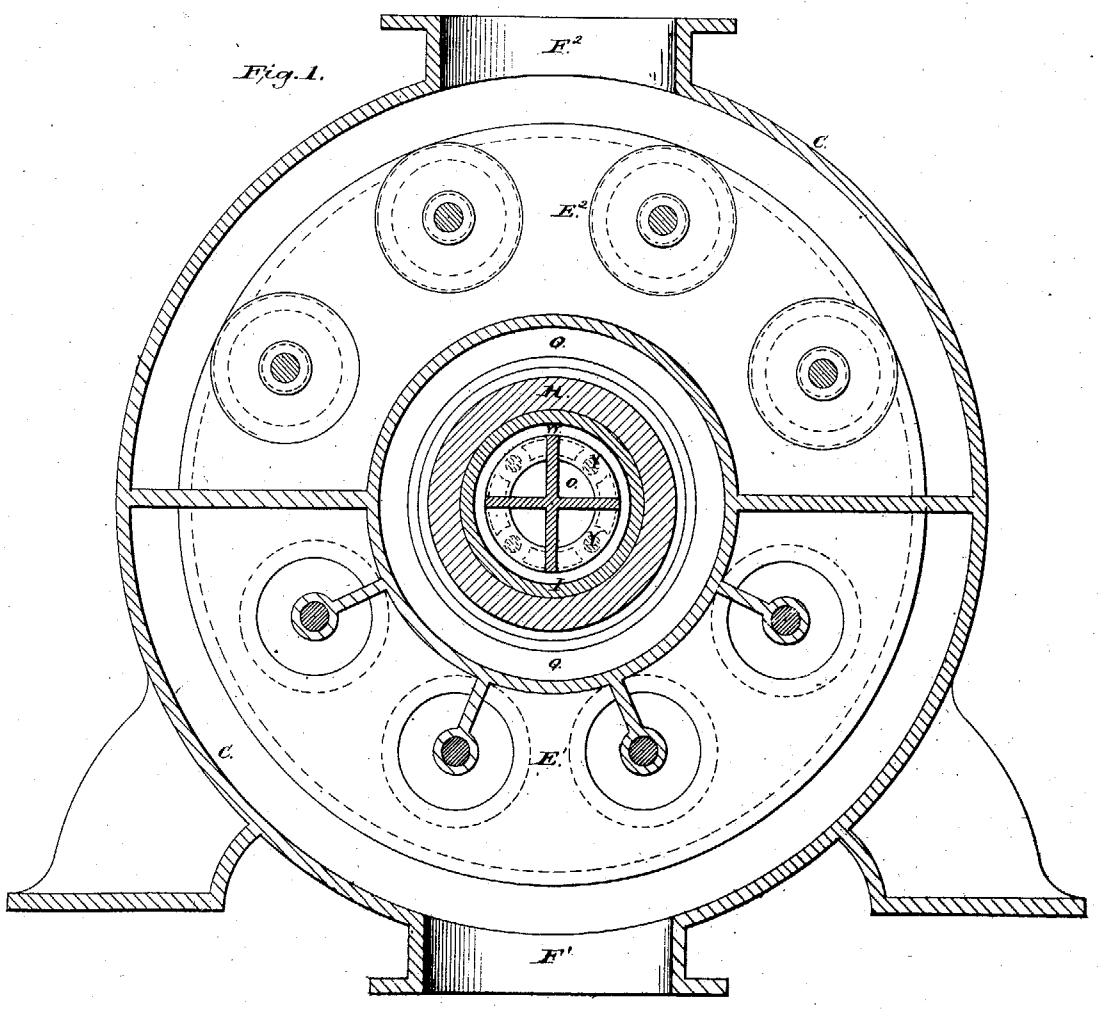

2 Sheets—Sheet 1.

A. J. L. LORETZ.

COMPOUND HIGH AND LOW-PESSURE STEAM-PUMPS.

No. 7,641. Reissued April 24, 1877.

Attest:

E. N. Dickerson Jr.
Geo. H. Evans

Inventor:

Arthur J. L. Loretz

2 Sheets—Sheet 2.

A. J. L. LORETZ.

COMPOUND HIGH AND LOW-PESSURE STEAM-PUMPS.

No. 7,641. Reissued April 24, 1877.

Attest:

E N Dickerson Jr.

Geo. N. Evans

Inventor:

Arthur J. L. Loretz

UNITED STATES PATENT OFFICE.

ARTHUR J. L. LORETZ, OF BROOKLYN, NEW YORK.

IMPROVEMENT IN COMPOUND HIGH AND LOW PRESSURE STEAM-PUMPS.

Specification forming part of Letters Patent No. 139,071, dated May 20, 1873; reissue No. 7,641, dated April 24, 1877; application filed June 24, 1876.

*To all whom it may concern:*

Be it known that I, ARTHUR J. L. LORETZ, of Brooklyn, in the county of Kings and State of New York, have invented a Compound High and Low Pressure Steam-Pump, of which the following is a specification:

My invention relates to that class of machinery known as compound high and low pressure steam-pumps.

These machines consist of the combination of a compound steam-engine and a pump, the compound steam-engine having its cylinders arranged in pairs, so that steam being admitted to the first cylinder, the boiler-pressure exerts its full force upon that cylinder without any expansion, or with very little expansion, and is then passed into the second cylinder, where it is allowed to expand down to or below the atmospheric pressure.

My invention consists of two pairs of such engines combined with a pump, the whole being inclosed in one case.

One of the peculiarities of my arrangement is that there are no valve-stems, or similar mechanisms, connecting with the atmosphere, through which steam might escape, and there are in the entire machine but three metal pieces acting as steam-valves. The valves which I mark as $R^1$ and $R^2$ perform a very important feature in my invention, serving the purpose of a steam-valve, admitting the steam to the expansion-cylinder; also, serving as part of the piston of the high-pressure cylinder, passing the steam which controls their own movement, and acting as an exhaust-valve, the whole being effected without any complication of parts, simply by the shaping and arrangement of one metal piece. This metal piece $R^1$ is controlled partly by the pressure of steam, partly by friction, partly by impact, and partly by the action of certain metal springs, which form a very important part of my invention, serving to cushion the action produced by the blow of valve $R^1$ against the tappet Y, and to arrest the movement of $R^1$, and also serving to open the connecting-valve between the high-pressure and low-pressure cylinder more quickly than it could be moved by the mere action of steam, and also serving to keep the low-pressure cylinder exhaust-valve firmly closed.

It is observable, likewise, in my invention, that all the steam-passages are straight passages, and the steam is not forced to traverse any circuitous paths through narrow openings, but the passages are all direct and straight from one chamber to another. It will be observed that this result is partly due to the fact that the motions of the different parts of this machine are all in parallel lines, the tappets and steam-valves move on the same central axis, the water-valves and pump-chambers are concentric, and the pistons and water-valves are also concentric with the same central axis. It will be observed, likewise, in Fig. 1, that large area of suction and delivery valves is obtained by placing them in an annular space surrounding the center of the pump-chamber. This chamber being set between the two water-pistons, the same water-chambers serve for both pistons, and direct passages to and from the valves are obtained. These valves are disk-valves supported on spindles, and the delivery-valves are set back to back on the same spindles, so that the opening of one tends to close the other, while the pressure of the water which flows out between them tends to close them both. The water passes into the pump-chambers from a space between two suction-valves, which valves are separated from the delivery-valves by a partition. It is plain that one valve of each pair is used in connection with one of the chambers of the double pump. The rings in the chamber Q are packed by means of the pressure of the water in chamber $E^2$ acting upon their backs.

In my invention, likewise, after the steam has been expanded down to or below the atmospheric pressure, it is passed into a pump-chamber and is there condensed by the action of the water upon it.

In most of the engines of this class the valve-gearing is operated by a separate motor, or what is termed an "auxiliary" or "supplemental" engine, the sole office of which is to operate and regulate the valve-movement of the main engine.

In my invention I make use of no separate valve-motor, but arrange the elements which constitute the valve-gear so as to perform the functions of an auxiliary or supplemental engine, or, in other words, incoporate the elements of a supplemental valve-gear in the main valve-motion of the engine. Thus the main steam-valve, acting as auxiliary valve—that is, in addition to admitting the high-pressure steam or supply into the motive high-pressure compartment—admits the steam upon the motive portion of the other valves, being also acted upon its faces by the pressure from within the high-pressure steam-chest and the varying pressure from without.

Also the equilibrium-valve and main exhaust-valve, which are one metal piece, in addition to the functions of admitting the high-pressure steam into the low-pressure compartment, and exhausting the same after expansion, performs the functions of auxiliary piston or valve mover, by being acted upon the opposite faces by the pressure of the steam within the high-pressure cylinder compartment and then admitting the steam into the low-pressure cylinder compartment, to act there again upon the face of the exhaust portion, each valve piece thus performing the functions of main valve and auxiliary or supplemental valve.

Another element used in this apparatus is a spring, which performs various functions, and becomes an important adjunct to the valve mechanism, although not being an indispensable element to make the machine operative, yet acts as an important element to assist in the operation and soften the actions of the impact of the valve-gear and main engine.

Figure 2:
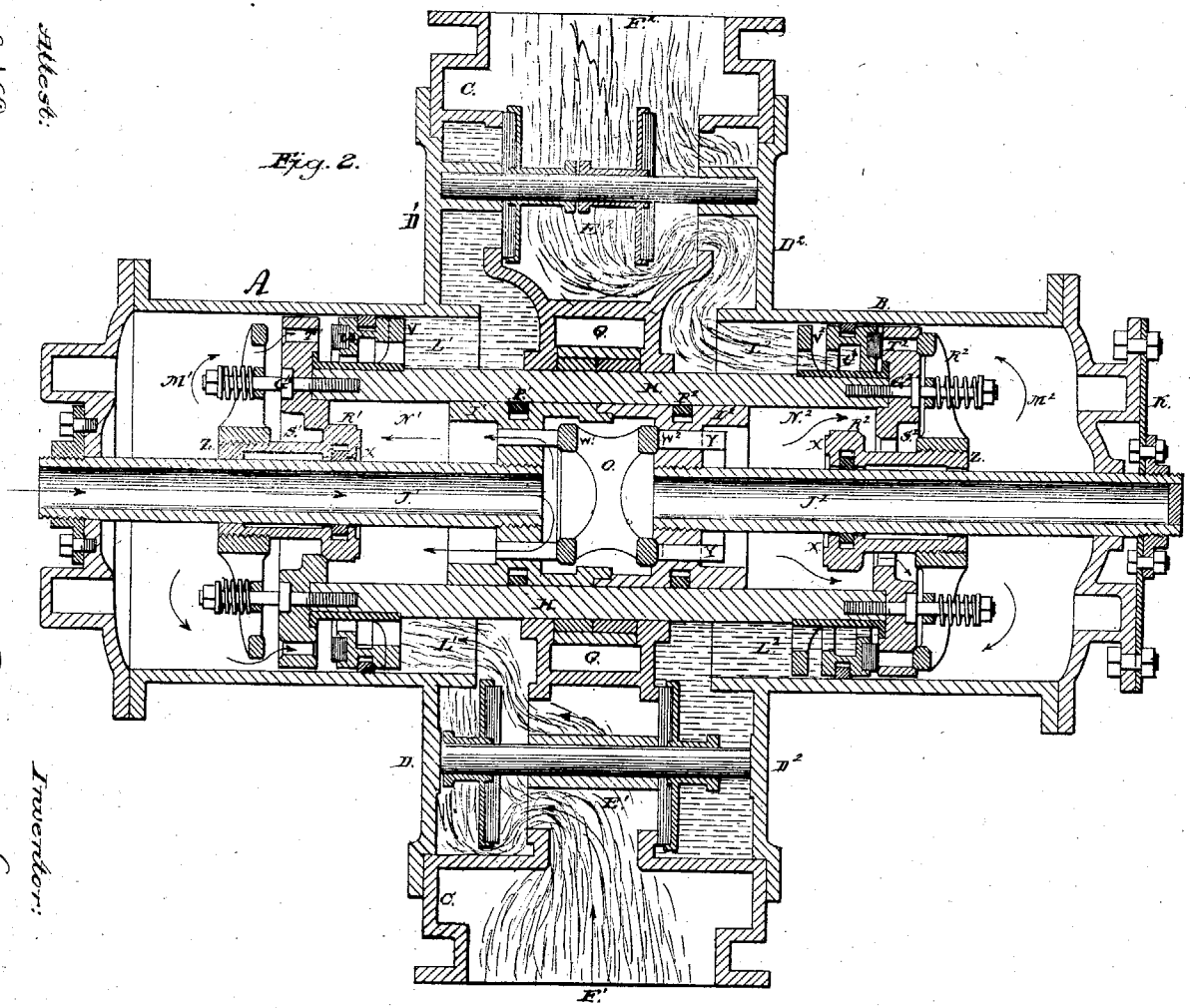

The invention consists of two cylinders, A and B, Fig. 2, bolted by flanges $D^1$ $D^2$ to each end of cylinder C, said cylinder C forming the water-valve chests and being divided into two compartments, Figs. 1 and 2, $E^1$ $E^2$, each provided with four metallic disk-valves, faced with rubber and working loose on spindles, compartment $E^1$ containing the suction-valves, and $E^2$ the delivery-valves, also provided with nozzles $F^1$ and $F^2$, to which the proper suction and delivery pipes are attached. Each cylinder A and B, Fig. 2, has a piston, $G^1$ and $G^2$, the two being connected together by the tubular piece H, thus uniting the two pistons and forming, with the cylinders A and B and water-chest C, four compartments or chambers, viz., $L^1$ $L^2$ $M^1$ $M^2$, two more, $N^1$ $N^2$, being formed inside the tubular piece H by the steam-chest $I^1$ $I^2$, which is held in position by the tubes $J^1$ and $J^2$, through which the steam enters the chest, each tube being made fast to the heads of cylinders A and B, the tube $J^2$ being bolted to a wrought-iron plate, K, which is bolted to head of cylinder B, making an expansion-joint, thus allowing for the difference of expansion between the large cylinder and tubes. The steam-chest is made in two pieces, $I^1$ and $I^2$, in order to enter the steam-valve O. The steam-chest has also two grooves, one in each half $P^1$ $P^2$, containing packing-rings acted upon by the steam from the chest, thus packing the interior of tubular piece H, the outside being packed by spring rings, or rings acted upon by the pressure of the water, set in the partition Q of the water-valve-chest cylinder C.

Thus it will be seen that there are six chambers, viz., $N^1$ and $N^2$ being the high-pressure cylinders, $M^1$ and $M^2$ the low-pressure cylinder-chambers, and $L^1$ $L^2$ the vacuum and water cylinder chambers, the latter connecting directly with the water-valve chest.

The valve motion and auxiliary or supplemental valve-gear consist of a double valve, O, Fig. 2, arranged with two faces, $W^1$ and $W^2$, provided with operating-tappets Y, and upon which faces it is acted upon by the pressure from within the steam-chest, and the varying pressure from without, and the movement of the main engine, through the medium of the impact of the face X of valve $R^2$ or $R^1$, and the tappets Y, the force of the blow of the last-mentioned operation, for the purpose of breaking the valve-joint $W^2$ or $W^1$, being reduced by the gradual application of the force of the engine occasioned by the receding of the face X of the double steam and exhaust valve $R^2$, which compresses the springs of said valve in the low-pressure cylinder between a nut on a stud which secures the piston $G^2$ or $G^1$ to tubular piece H and the valve. This action not only, as above stated, throws the said force gradually upon the tappets Y, for the above-mentioned purpose, but also arrests the movement of the valve $R^2$, for the purpose of closing and opening passages $S^2$ and $T^2$ without shock; and, furthermore, reduces the force of the impact of face Z of valve $R^1$ on the opposite side, and the inside face of cylinder-head of A, by retarding the movement of the combination of pistons (the main engine) to the extent of their compression.

The force of this impact is also reduced by the compression of the springs at the end of the engine, where the impact occurs, as will now be explained. Suppose the valve $R^1$ and piston G to be moving toward the head of cylinder $M^1$; then it is evident that the force of the impact will be determined by the force which holds $R^1$ against G in closing the port $S^1$; or, in other words, by the pressure of steam in cylinder N. It is plain, if this pressure on the face X of $R^1$ be reduced, either by a decrease of steam-pressure, or by a counter-acting pressure on $R^1$, that the force of the impact between Z and the cylinder-head will be correspondingly reduced. The action of the springs on the back of $R^1$ is to counter-balance the steam-pressure on X, and, therefore, to reduce the force of the impact between Z and the cylinder-head.

The operation of the pump is thus: The steam, entering through either of the tubes $J^1$ or $J^2$, but now represented in Fig. 2 entering $J^1$, enters and fills the interior of the steam-chest $I^1$ $I^2$. The main steam-valve O having previously been thrown open, the steam enters through the valve-openings, as represented by the arrows, into the high-pressure steam-chamber $N^1$. Now, the steam-chest being held fast by the tubes $J^1$ and $J^2$, the steam will move the whole combination of piston $G^1$, $G^2$, and H, forward. The steam also, pressing against the back of the valve $R^1$, throws or holds it in its forward position, keeping the steam from escaping through the passage $S^1$ of piston $G^1$ into the low-pressure cylinder-chamber, and compressing the springs between the nut on the stud, securing the piston $G^1$ to the tubular piece H, and the said valve $R^1$, thereby transferring a portion of the entire pressure upon X to the extent of the compression of the spring into the motive pistons, and counteracting the pressure upon the face X, or balancing the valve $R^1$ in regard to the pressure from within the cylinder-chamber $N^1$ to the same extent, the valve $R^1$ also opening the passage $T^1$ on the inside of low-pressure cylinder $M^1$, allowing the vapor that has been used in the previous stroke to escape through $T^1$, passing the annular water-valve $U^1$, (which is open and bears against its guard V,) and then into the water-valve chest.

The vapor being below the atmospheric pressure, the atmosphere will force the water into the water-cylinder $L^1$, entering first the nozzle $F^1$, opening the suction-valves, and then entering the cylinder $L^1$. Now, should the water enter with too great a velocity into the cylinder $L^1$, the annular water-valve $U^1$ will close the passage $T^1$, keeping the water from entering the low-pressure cylinder-chamber $M^1$; also, packing the piston $G^1$ by acting upon the packing-rings in the valve $U^1$. The valve being closed, and not allowing the vapor to pass into the water, and the space in the low-pressure cylinder continually decreasing, the vapor being compressed will again create a pressure which will immediately open the valve $U^1$, again allowing the steam to mix in with the water.

The part of the valve $R^1$ in the high pressure cylinder around the tube $J^1$ is packed by a ring, which is acted upon by the pressure of the steam in cylinder $N^1$.

Now, while the aforesaid operation is taking place in cylinder A, the high-pressure steam which was previously in cylinder-chamber $N^2$ now passes through the passages $S^2$ of piston $G^2$ into the low-pressure cylinder-chamber $M^2$, and acting upon piston $G^2$, a part being in equilibrium with $N^2$, the valve $R^2$ closing the passage $T^2$, the valve being acted upon by the varying low-pressure steam and the springs, which, in the previous stroke, were kept compressed by the pressure of the steam acting upon the portion of the valve in the high-pressure cylinder-chamber $N^2$, the friction of valve $R^2$, where fitting around the tube $J^2$, being reduced by the pressure of the steam being taken off the packing-rings, in consequence of the high-pressure cylinder $N^2$ being thrown into equilibrium with the low-pressure cylinder $N^2$. The annular water-valve, which is faced with rubber, closing the passage $T^2$ of the piston $G^2$, being acted upon by the atmospheric pressure and the height of the column of water to which it is forced, the piston $G^2$ being packed by the water-pressure acting on the packing-rings in the water-valves $U^2$. Now, when the pistons approach the ends of their stroke, the face X of the valve $R^2$ in the cylinder-chamber $N^2$ will strike the projecting tappets Y of the steam-valve O, that valve being acted upon by the pressure of the steam on the inside, and there being almost a perfect vacuum on the outside in the cylinder $N^2$ by the entire expansion of the steam. The valve $R^2$ will then, of course, move toward its seat, in preference to the opening of the valve O, thereby closing the passage $S^2$, the blow of closing being somewhat checked by the compressing of the spring acting against the valve in the cylinder $M^2$. The valve $R^2$ being seated on the face of piston $G^2$, we then have the entire pressure of steam in cylinder-chamber $N^1$, in addition to the expanding steam in low-pressure cylinder and momentum, to open the valve O on the side of the cylinder $N^2$.

The force of the main engine having been gradually brought to bear upon the tappets Y by the receding of the face X of the valve $R^2$ and the compressing of its spring, which is the medium through which the power of the main engine is applied for the purpose of moving and breaking the joint of the face $W^2$ of the valve O. Now, as soon as the steam enters the cylinder $N^2$, the passage $S^2$ having previously been closed, the pressure of steam in cylinder $N^2$ will become equal to that in the steam-chest—that is, before the piston $G^2$ begins to move on the return stroke—thus placing the one-half $W^2$ of the valve O in equilibrium.

Again, while the valve $R^2$ has opened the steam-valve O by striking the tappets Y, the valve $R^1$ in cylinder $M^1$ has struck the cylinder-head of A with its face Z, opening the passage $S^1$ of piston $G^1$, the steam in cylinder $N^1$ rushing into the low-pressure cylinder $M^1$, the force of the impact of the two faces—the cylinder-head of A and face Z of valve $R^1$—being somewhat reduced by the decrease of speed of the moving combination of pistons, caused by the compressing of the springs on the opposite side, as just described.

The pressure being thus diminished in $N^1$, and the face $W^1$ of the valve O having been brought closer to its seat, and consequently within the reach of action upon its interior face by the pressure within the steam-chest, the side $W^1$ of valve O will be thrown out of equilibrium, causing it to fly over and close the steam-openings of cylinder $N^1$ and opening those of cylinder $N^2$.

The steam being shut off from cylinder $N^1$, and the valve $R^1$ having been opened a little by the aforesaid operation, the steam will still exert its elastic force by moving the combination of pistons by the pressure of the expanding steam acting upon the whole acting-surface in low-pressure cylinder $M^2$ and the interior face of the piston $G^1$ in compartment $N^1$, minus the portion of the face X of valve $R^1$, which forms part of the piston, the pressures of steam upon this latter face holding the valve $R^1$ against the head of cylinder A. By this action the spring, which was previously compressed in $M^1$, will recede, thereby assisting the motion-pistons with the expanding steam and momentum to complete their stroke against the cushioning action of the steam in $N^2$, just admitted, until sufficient steam from $N^1$ has entered $M^1$, thereby reducing the pressure in $N^1$, and increasing that in $M^1$, consequently throwing the portion of the valve $R^1$ in $N^1$ into equilibrium, and acting upon the face of $R^1$, which covers the passage $T^1$ in $M^1$, and which, by the above-mentioned movement, has been brought closer toward its seat, and, consequently, within reach of action, when the whole actions will suddenly be reversed, the valve $R^1$ flying toward the piston $G^1$, covering its said passage $T^1$ and opening $S^1$ by the action of the steam upon its surface in $M^1$, (which surface, upon examination of Fig. 2, will be found double that of X, thus increasing its motive action in this direction in the same proportion,) and the action of the springs which were released by the pressure taken off face X, thus keeping the expanding steam from going through into the water, and allowing the steam from $N^1$, now expanding into $M^1$, to exert its elastic force against the piston $G^1$ in compartment $M^1$, and assist the exertion of the high steam in $N^2$ on the return movement of the combination of pistons or main engine, the friction of the valve $R^1$ around the tube $J^1$ being also reduced by not being acted upon by the steam, there being an equilibrium of steam in the cylinders $N^1$ and $M^1$ when the pressure of the expanding steam falls below that of the atmosphere, or that of the height of the column of water that is being pumped; then the annular water-valve $U^1$ will keep the water from entering the cylinder $M^1$ through the passage $T^1$—also packing the piston $G^1$ with the water acting upon the packing-rings in its periphery.

Having explained my invention, what I claim, and desire to secure by Letters Patent, is—

1. The arrangement of the pistons $G^1$ $G^2$, in their cylinders A and B, connected by tubular piece H, the partition Q of the vacuum and pump chamber C, the steam-chest $I^1$ $I^2$, and chambers $N^1$ $N^2$, $M^1$ $M^2$, and $L^1$ $L^2$, all constructed to operate substantially as and for the purpose set forth.

2. The combination of the double valve $R^1$, its packing-rings and springs, the tubes $J^1$ $J^2$, with the cylinder $N^1$ $N^2$ and $M^1$ $M^2$, all arranged substantially as shown, and for the purpose specified.

The combination of the annular valve U, provided with packing-rings, with the double valve $R^1$, arranged substantially as shown, and for the purpose described.

4. The combination of the steam-chests $I^1$ $I^2$, having grooves $P^1$ $P^2$, and packing, with the double valve O, tappets Y, connecting-tube H, tubes $J^1$ $J^2$, secured to cylinders A and B and suitable valve-openings, substantially as and for the purpose described.

5. The cylinders A B, bolted with flanges $D^1$ $D^2$ to the chamber C, containing the suction and delivery valves, in combination with the pistons $G^1$ $G^2$, passages $S^1$ $S^2$ $T^1$ $T^2$, tube H, double valve $R^1$, annular valve U, steam-chest $I^1$ $I^2$, valve O, and tubes J, all arranged substantially as and for the purpose specified.

6. A steam-valve, $R^1$, in combination with the means, substantially as specified, whereby it is moved by three forces, the movement of the engine, the force of the steam upon its surface, and the action of a compressed spring, the blow of the engine upon the valve being cushioned by means of a spring, and the valve moving slower than it would without the intervention of the spring, substantially as described.

7. The combination of a double valve, $R^1$, acting as main valve and auxiliary piston and valve O, acting as a main and auxiliary valve, with a spring acting to start the double valve $R^1$, and move the same toward one of its seats, with the assistance of the steam admitted by valve O, in addition to the functions of cushioning the actions of the tappets Y of valve O against the valve $R^1$, and cushioning the action of the valve on one of its seats, substantially as described.

8. A compound valve-piece, $R^1$, in combination with and acting as the connecting-valve between a high and low pressure cylinder, and as the exhaust-valve for a low-pressure cylinder, combined with and carried in the piston of the high or low pressure cylinder, substantially as described.

9. A compound valve-piece $R^1$, in combination with and acting as the connecting-valve between a high and low pressure cylinder, and as the exhaust-valve for a low-pressure cylinder, and being actuated by the pressure of steam upon its surface, the said valve admitting the steam which acts upon it in the low-pressure cylinder, substantially as described.

10. The combination of a steam-valve and a spring, which spring serves to cushion the action produced by the blow between a tappet and the valve, and to aid in arresting the movement of the valve, substantially as described.

11. The combination of a steam-valve and a spring, which spring serves to cushion the action produced by the blow between a tappet and the valve, and to aid in arresting the movement of the valve, and also to act at the proper time to move the valve, substantially as described.

12. A compound steam-engine arranged with a steam-chest in the center of the system, so that the steam passes into the engine in a space between two high-pressure pistons, the valve of the said steam-chest being operated entirely by forces within the cylinder, and there being no valve-stem or other controlling mechanism connected with motive power outside of the cylinder, in combination with the valves of a low-pressure cylinder, substantially as described.

13. The combination of a water-cylinder, two water-pistons, and a set of suction and delivery valves surrounding the water-cylinder, the said valves and their communicating ports being set between the two pistons, whereby direct passages between the water-chambers and the suction and delivery pipes are obtained, substantially as described.

14. The combination of a steam-pump with a packing-ring, which serves to close a sliding joint, and which is packed by means of the continuous pressure of the delivery-water upon its back, substantially as described.

15. The combination of a main valve, an auxiliary valve, and a tappet, concentric with each other and moving on the same central axis, whereby direct action of all the parts on each other is obtained, substantially as described.

16. The combination of a main valve, an auxiliary valve, an auxiliary piston and a tappet, concentric with each other and moving on the same central axis, whereby direct action of all the parts on each other is obtained, substantially as described.

17. The combination of a main valve, an auxiliary valve, and a tappet, concentric with each other and moving on the same central axis with a spring, which serves to arrest the movement of the main valve, substantially as described.

18. The combination of a main valve, an auxiliary valve, an auxiliary piston and a tappet, concentric with each other and moving on the same central axis with a spring, which serves to arrest the movement of the main valve, substantially as described.

19. The combination of an auxiliary valve and tappet formed of one piece of metal, with a steam-valve and spring, which serves to arrest the movement of the steam-valve, arising from the impact between the tappet and the valve, substantially as described.

ARTHUR J. L. LORETZ.

Witnesses:

E. N. DICKERSON, Jr.,

GEO. H. EVANS.